United States Patent
Araujo Da Silva et al.

(10) Patent No.: US 12,036,819 B2
(45) Date of Patent: Jul. 16, 2024

(54) PNEUMATIC TIRE COMPRISING A RUBBER COMPOSITION BASED ON EPOXIDIZED POLYISOPRENE AND A POLYAMIDE HAVING A LOW MELTING POINT

(71) Applicant: COMPAGNIE GENERALE DES ETABLISSEMENTS MICHELIN, Clermont-Ferrand (FR)

(72) Inventors: Jose-Carlos Araujo Da Silva, Clermont-Ferrand (FR); Romain Libert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 632 days.

(21) Appl. No.: 17/284,031

(22) PCT Filed: Oct. 7, 2019

(86) PCT No.: PCT/FR2019/052367
§ 371 (c)(1),
(2) Date: Apr. 9, 2021

(87) PCT Pub. No.: WO2020/074815
PCT Pub. Date: Apr. 16, 2020

(65) Prior Publication Data
US 2021/0331520 A1 Oct. 28, 2021

(30) Foreign Application Priority Data

Oct. 11, 2018 (FR) .................................. 1859414

(51) Int. Cl.
| | |
|---|---|
| *B60C 1/00* | (2006.01) |
| *C08F 136/08* | (2006.01) |
| *C08K 3/06* | (2006.01) |
| *C08K 5/47* | (2006.01) |
| *C08L 15/00* | (2006.01) |
| *C08L 77/02* | (2006.01) |
| *C08L 77/06* | (2006.01) |

(52) U.S. Cl.
CPC .......... *B60C 1/0016* (2013.01); *C08F 136/08* (2013.01); *C08K 3/06* (2013.01); *C08K 5/47* (2013.01); *C08L 15/00* (2013.01); *C08L 77/02* (2013.01); *C08L 77/06* (2013.01); *B60C 2200/065* (2013.01); *B60C 2200/08* (2013.01)

(58) Field of Classification Search
CPC .......... B60C 1/00; C08F 136/08; C08L 15/00; C08L 77/02; C08L 77/06; C08K 3/06; C08K 5/47

USPC .............................................. 523/156
See application file for complete search history.

(56) References Cited

U.S. PATENT DOCUMENTS

| | | |
|---|---|---|
| 3,883,487 A | 5/1975 | Raabe et al. |
| 5,227,425 A | 7/1993 | Rauline |
| 5,459,230 A | 10/1995 | de Jong et al. |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 6,590,063 B2 | 7/2003 | Poessnecker et al. |
| 6,610,261 B1 | 8/2003 | Custodero et al. |
| 6,747,087 B2 | 6/2004 | Custodero et al. |
| 6,975,396 B2 | 12/2005 | Custodero et al. |
| 7,135,517 B2 | 11/2006 | Simonot et al. |
| 7,199,175 B2 | 4/2007 | Vasseur |
| 7,202,295 B2 | 4/2007 | Simonot et al. |
| 7,250,463 B2 | 7/2007 | Durel et al. |
| 7,256,233 B2 | 8/2007 | Simonot et al. |
| 7,425,313 B2 | 9/2008 | Custodero et al. |
| 7,820,771 B2 | 10/2010 | Lapra et al. |
| 7,900,667 B2 | 3/2011 | Vasseur |
| 8,461,269 B2 | 6/2013 | Varagniat et al. |
| 8,686,086 B2 | 4/2014 | Abad et al. |
| 8,883,929 B2 | 11/2014 | Gandon-Pain et al. |
| 11,241,370 B2 | 2/2022 | Valero et al. |
| 2001/0034389 A1 | 10/2001 | Vasseur |
| 2002/0004549 A1 | 1/2002 | Custodero et al. |
| 2002/0022670 A1 | 2/2002 | Poessnecker et al. |
| 2003/0202923 A1 | 10/2003 | Custodero et al. |
| 2003/0212185 A1 | 11/2003 | Vasseur |
| 2004/0030017 A1 | 2/2004 | Simonot et al. |
| 2005/0004297 A1 | 1/2005 | Durel et al. |
| 2005/0032965 A1 | 2/2005 | Valero |
| 2005/0171264 A1 | 8/2005 | Simonot et al. |

(Continued)

FOREIGN PATENT DOCUMENTS

| | | |
|---|---|---|
| CN | 102918089 A | 2/2013 |
| CN | 104080596 A | 10/2014 |

(Continued)

OTHER PUBLICATIONS

International Search Report dated Jan. 30, 2020, in corresponding PCT/FR2019/052367 (4 pages).

(Continued)

*Primary Examiner* — Deve V Hall
(74) *Attorney, Agent, or Firm* — VENABLE LLP

(57) ABSTRACT

A tire has improved mechanical properties and comprises a rubber composition based on at least one elastomeric matrix mainly comprising at least one epoxidized polyisoprene having a molar degree of epoxidation greater than 40%, at least one polyamide of which the melting point is less than 170° C., and a crosslinking system.

6 Claims, No Drawings

(56) References Cited

U.S. PATENT DOCUMENTS

| | | |
|---|---|---|
| 2005/0267242 A1 | 12/2005 | Custodero et al. |
| 2006/0009564 A1 | 1/2006 | Simonot et al. |
| 2007/0112120 A1 | 5/2007 | Vasseur |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2010/0056670 A1* | 3/2010 | Zhao ................. C08L 9/00 524/346 |
| 2010/0221541 A1 | 9/2010 | Valero et al. |
| 2011/0021702 A1 | 1/2011 | Gandon-Pain et al. |
| 2011/0263784 A1 | 10/2011 | Valero et al. |
| 2012/0208948 A1 | 8/2012 | Gandon-Pain et al. |
| 2013/0096230 A1 | 4/2013 | Abad et al. |
| 2015/0030851 A1 | 1/2015 | Abad et al. |
| 2017/0190217 A1* | 7/2017 | Joseph ................. C08L 7/00 |
| 2020/0190326 A1 | 6/2020 | Coste et al. |
| 2021/0291590 A1 | 9/2021 | Araujo da Silva et al. |
| 2021/0292516 A1 | 9/2021 | Guery et al. |

FOREIGN PATENT DOCUMENTS

| | | |
|---|---|---|
| DE | 2324160 | 11/1974 |
| EP | 0501227 A1 | 9/1992 |
| EP | 0627454 A2 | 12/1994 |
| EP | 0735088 A1 | 10/1996 |
| EP | 0810258 A1 | 12/1997 |
| EP | 1153957 A2 | 11/2001 |
| WO | 97/36724 A2 | 10/1997 |
| WO | 99/16600 A1 | 4/1999 |
| WO | 99/28376 A2 | 6/1999 |
| WO | 00/5300 A1 | 2/2000 |
| WO | 00/5301 A1 | 2/2000 |
| WO | 00/73372 A1 | 12/2000 |
| WO | 02/10269 A2 | 2/2002 |
| WO | 02/053634 A1 | 7/2002 |
| WO | 03/016215 A1 | 2/2003 |
| WO | 03/016387 A1 | 2/2003 |
| WO | 2004/003067 A1 | 1/2004 |
| WO | 2004/056915 A1 | 7/2004 |
| WO | 2006/069792 A1 | 7/2006 |
| WO | 2006/069793 A1 | 7/2006 |
| WO | 2007/070728 A2 | 6/2007 |
| WO | 2008/003434 A1 | 1/2008 |
| WO | 2008/003435 A1 | 1/2008 |
| WO | WO-2015117863 A1 * | 8/2015 .......... B60C 1/0016 |
| WO | 2018/104671 A1 | 6/2018 |
| WO | 2018/115760 A1 | 6/2018 |

OTHER PUBLICATIONS

S. Brunauer, et al., "Adsorption of Gases in Multimolecular Layers", J. Am. Chem. Soc., vol. 60, pp. 309-319 (1938).

\* cited by examiner

PNEUMATIC TIRE COMPRISING A RUBBER COMPOSITION BASED ON EPOXIDIZED POLYISOPRENE AND A POLYAMIDE HAVING A LOW MELTING POINT

BACKGROUND

The field of the present invention is that of rubber compositions reinforced by a reinforcing filler which can be used in the manufacture of tyres for vehicles.

During running, a tyre tread is subjected to mechanical stresses and to attacks resulting from direct contact with the ground. In the case of a tyre fitted to a vehicle bearing heavy loads, the mechanical stresses and the attacks undergone by the tyre are magnified under the effect of the weight borne by the tyre.

Off-road tyres are subjected to high stresses, both locally: running over the indenting macrobodies represented by the stones from which the tracks are formed (crushed rock), and also globally: high torque transmission during running on slopes, generally of about 10%, and high stresses on the tyres during U-turns for loading and unloading manoeuvres.

The consequence of this is that the initiating cracks, which are created in the tread under the effect of these stresses and these attacks, have a tendency to propagate further. The propagation of cracks within the tyre can lead to damage thereof and can therefore reduce its life.

This is particularly true for the tyres equipping civil engineering vehicles which are moving about generally in mines. This is also true for the tyres which are fitted to agricultural vehicles, due to the stony ground surface of arable land. The tyres which equip worksite heavy-duty vehicles, which are moving both on stony ground surfaces and on bituminous ground surfaces, also experience these same attacks. Due to the two aggravating factors, which are the weight borne by the tyre and the aggressive nature of the running ground, the resistance to the initiation of cracks and the good mechanical properties of a tyre for a civil engineering vehicle, an agricultural vehicle or a heavy-duty construction vehicle prove to be crucial for increasing its life.

It is therefore important to have tyres available for vehicles, in particular those carrying heavy loads, the composition of which has improved mechanical properties.

Continuing its research, the applicant has discovered that the combination of a specific elastomeric matrix and the addition of polyamide in a particular form to a rubber composition for tyres makes it possible to solve the aforementioned technical problem.

SUMMARY

Thus, a subject of the present invention is a tyre which comprises a rubber composition based on an elastomeric matrix mainly comprising at least one epoxidized polyisoprene having a molar degree of epoxidation greater than 40%, at least one polyamide of which the melting point is less than 170° C., and a crosslinking system.

A subject of the present invention is also a process for preparing a composition for the manufacture of tyres according to any one of the preceding claims, characterized in that it comprises the following steps:

a) bringing into contact and mixing, concomitantly or successively, in one or more goes, at least one epoxidized polyisoprene having a molar degree of epoxidation greater than 40%, and a polyamide, the melting point of which is less than 170° C., by thermomechanically kneading everything until reaching a maximum temperature T1 greater than or equal to the melting point of the polyamide of which the melting point is less than 170° C., b) reducing the temperature of the mixture obtained in step (a) to a maximum temperature T2 lower than the melting point of the polyamide, the melting point of which is less than 170° C., then incorporating a crosslinking system into the mixture and kneading everything.

The invention and its advantages will be easily understood in the light of the description and implementational examples which follow.

DETAILED DESCRIPTION

I—DEFINITIONS

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

For the purposes of the present invention, the expression "part by weight per hundred parts by weight of elastomer" (or phr) should be understood as meaning the part by weight per hundred parts by weight of elastomer.

In the present document, unless expressly indicated otherwise, all the percentages (%) indicated are percentages (%) by weight.

Furthermore, any interval of values denoted by the expression "between a and b" represents the range of values extending from more than "a" to less than "b" (i.e. limits a and b excluded), while any interval of values denoted by the expression "from a to b" means the range of values extending from "a" up to "b" (i.e. including the strict limits a and b). In the present document, when an interval of values is described by the expression "from a to b", the interval represented by the expression "between a and b" is also and preferably described.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. Preferably, the term "predominant" is understood to mean present at more than 50%, preferably more than 60%, 70%, 80%, 90%, and more preferentially the "predominant" compound represents 100%.

The compounds comprising carbon mentioned in the description can be of fossil origin or biosourced. In the latter case, they may be partially or completely derived from biomass or may be obtained from renewable starting materials derived from biomass. Polymers, plasticizers, fillers, etc., are concerned in particular.

The glass transition temperatures (Tg) described in the present document are measured in a known way by DSC (Differential Scanning calorimetry) according to standard ASTM D3418 (1999).

II—DESCRIPTION OF THE INVENTION

II-A Tyre

II-A-1 Elastomeric Matrix

The composition of the tyre according to the invention has the essential characteristic of comprising an elastomeric matrix which mainly comprises at least one epoxidized polyisoprene having a molar degree of epoxidation greater than 40%.

In the present document, the term "polyisoprene" is intended to mean a polyisoprene which is not epoxidized. The polyisoprene can be natural rubber, a synthetic polyisoprene having a molar content of cis-1,4 bonds of at least 90%, or a mixture thereof.

The term "epoxidized polyisoprene" is intended to mean a polyisoprene which has undergone an epoxidation step. The epoxidized polyisoprene can be an epoxidized natural rubber, an epoxidized synthetic polyisoprene having a molar content of cis-1,4 bonds of at least 90% before epoxidation, or a mixture thereof.

The epoxidized polyisoprene used in the context of the present invention is an elastomer and is not to be confused with an epoxidized polyisoprene of low molar mass, generally used as plasticizer, which is not an elastomer due to its low molar mass. An epoxidized polyisoprene, as elastomer, generally has a high Mooney viscosity in the raw state. The Mooney viscosity (ML 1+4) at 100° C. of the epoxidized polyisoprene used in the context of the present invention is greater preferably than 20, more preferably than 30 and more preferably still than 40. It is also generally less than or equal to 150. As an indication, the Mooney viscosities (ML 1+4) at 100° C. of the epoxidized polyisoprenes are preferentially from 30 to 150, more preferentially from 40 to 150, even more preferentially from 50 to 140.

The Mooney viscosity is measured using an oscillating consistometer as described in Standard ASTM D1646 (1999). The measurement is carried out according to the following principle: the sample, analysed in the raw state (i.e., before curing), is moulded (shaped) in a cylindrical chamber heated to a given temperature (for example 100° C.). After preheating for 1 minute, the rotor rotates within the test specimen at 2 revolutions/minute and the working torque for maintaining this movement is measured after rotating for 4 minutes. The Mooney viscosity (ML 1+4) is expressed in "Mooney unit" (MU, with 1 MU=0.83 newton.metre).

Thus, according to the invention, the at least one epoxidized polyisoprene, having a molar degree of epoxidation ranging from 5% to 85%, advantageously has a Mooney viscosity (ML 1+4) at 100° C., measured according to standard ASTM D1646 (1999), within a range extending from 30 to 150, preferably from 40 to 150, more preferably from 50 to 140.

The epoxidized polyisoprene, whether it is an epoxidized natural rubber or an epoxidized synthetic polyisoprene, can be obtained in a known way by epoxidation of polyisoprene, for example by processes based on chlorohydrin or bromohydrin or processes based on hydrogen peroxides, alkyl hydroperoxides or peracids (such as peracetic acid or performic acid). Epoxidized polyisoprenes are commercially available. The molar degree of epoxidation, which is information provided by the suppliers, corresponds to the ratio of the number of epoxidized moles of isoprene unit to the number of moles of isoprene unit in the polyisoprene before epoxidation.

As examples of commercially available epoxidized polyisoprenes, mention may be made of Epoxyprene 25 and Epoxyprene 50 from the company Guthrie or Ekoprena 25 and Ekoprena 50 from the company Felda.

According to the present invention, the expression "at least one epoxidized polyisoprene" should be understood as one or more epoxidized polyisoprenes which can differ in terms of either their microstructure, their macrostructure or their degree of epoxidation. In the case where the polyisoprene comprises several epoxidized polyisoprenes, the reference to the amount of epoxidized polyisoprene of the polyisoprene applies to the total weight of the epoxidized polyisoprenes of the polyisoprene. For example, the characteristic according to which the epoxidized polyisoprene is present in the rubber composition at a content of greater than 50 phr means that, in the case of a mixture of epoxidized polyisoprenes, the total weight of epoxidized polyisoprenes is greater than 50 phr.

In the case where the epoxidized polyisoprene is a mixture of epoxidized polyisoprenes which can differ from one another in their molar degree of epoxidation, the reference to a molar degree of epoxidation, whether preferential or not, applies to each of the epoxidized polyisoprenes of the mixture.

According to the invention, the molar degree of epoxidation of the at least one epoxidized polyisoprene having a molar degree of epoxidation greater than 40% is advantageously within a range extending from 40% to less than 85%, preferably between 40% and 75%, more preferably from 42% to 60%.

The content of epoxidized polyisoprene having a molar degree of epoxidation greater than 40%, in the rubber composition of the tyre according to the invention, is advantageously within a range extending from 80 to 100 phr, preferably from 90 to 100 phr, more preferably 100 phr.

Optionally, when the content of polyisoprene is less than 100 phr, the rubber composition in accordance with the invention comprises another elastomer, preferentially a diene elastomer.

The term "other elastomer" is understood to mean an elastomer other than epoxidized polyisoprene having a molar degree of epoxidation greater than 40%.

The term "diene" elastomer (or, without distinction, rubber), whether natural or synthetic, should be understood, in a known way, as meaning an elastomer consisting, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". The term "essentially unsaturated" is generally understood to mean a diene elastomer resulting at least in part from conjugated diene monomers having a content of units of diene origin (conjugated dienes) which is greater than 15% (mol %); it is thus that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin).

The expression "diene elastomer that can be used in the compositions in accordance with the invention" is understood particularly to mean:
a) any homopolymer of a conjugated or non-conjugated diene monomer having from 4 to 18 carbon atoms,
b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

Preferentially, the other elastomer is a diene elastomer selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Particularly advantageously, when another elastomer is present in the composition of the tyre according to the invention, it is an isoprene elastomer other than epoxidized polyisoprene having a molar degree of epoxidation ranging from 5% to 85%. It may be, for example, an epoxidized polyisoprene having a molar degree of epoxidation of less than 5%, or greater than 85%, or a non-epoxidized isoprene elastomer, or else a mixture thereof.

The term "isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferentially still of greater than 98%.

The content of the other elastomer in the composition of the tyre according to the invention is preferentially within a range extending from 0 to 20 phr and preferably from 0 to 10 phr.

Advantageously, the composition of the tyre according to the invention does not comprise non-epoxidized natural rubber or comprises less than 10 phr thereof, preferably less than 8 phr, more preferably less than 5 phr.

II-A-2 Polyamide

The composition of the tyre according to the invention also has the essential characteristic of being based on at least one polyamide, the melting point of which is less than 170° C.

The melting is measured in a well-known manner by DSC according to standard ASTM D3418 (2015).

Any polyamide with a melting point of less than 170° C. can be used.

The polyamides used in the context of the present invention can be homopolymers or copolymers, which can come from the condensation of lactams, optionally with lactones, and/or from the condensation of diacids and/or amino acids with diamines. Preferably, the polyamides used in the context of the present invention are copolymers, which come from the condensation of lactams, optionally with lactones, and/or from the condensation of diacids and/or amino acids with diamines.

A copolymer is, in a manner well known to those skilled in the art, a polymer resulting from the copolymerization of at least two types of chemically different monomer, called comonomers.

Particularly advantageously, the polyamide of which the melting point is less than 170° C. is a copolymer polyamide consisting of at least two different types of monomers selected from the group consisting of lactams, or of at least two different types of monomers selected from the group consisting of diacids and of at least two different types of monomers selected from the group consisting of diamines.

The lactams can for example have 3 to 12 carbon atoms on their main ring and can be substituted. Preferably, the lactams are selected from the group comprising or consisting of β,β-dimethylpropriolactam, α,α-dimethylpropriolactam, amylolactam, caprolactam, capryllactam, oenantholactam, 2-pyrrolidone, lauryllactam and mixtures thereof. More preferably, the lactams are selected from the group comprising or consisting of caprolactam, lauryllactam and mixtures thereof.

The diacids (or dicarboxylic acids) can be, for example, acids having between 4 18 carbon atoms. Preferably, the diacids are selected from the group comprising or consisting of adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dodecanedioic acid, and mixtures thereof. More preferably, the diacids are selected from the group comprising or consisting of adipic acid, dodecanedioic acid and mixtures thereof.

The diamines can be, for example, saturated aliphatic, aryl and/or cyclic diamines having 6 to 12 atoms. Preferably, the diamines are selected from the group comprising or consisting of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophorone diamine (IPD), methyl pentamethylenediamine (MPDM), bis(aminocyclohexyl)methane (BACM), bis(3-methyl-4 aminocyclohexyl)methane (BMACM), methaxylyenediamine, bis-p-aminocyclohexylmethane, trimethylhexamethylenediamine, phenylenediamine and mixtures thereof. More preferably, the diamines are selected from the group comprising or consisting of hexamethylenediamine, dodecamethylenediamine and mixtures thereof.

The amino acids can, for example, be alpha-omega amino acids. Preferably, the amino acids are selected from the group comprising or consisting of aminocaproic acid, 7-aminoheptanoic acid, 11-aminoundecanoic acid, n-heptyl-11-aminoundecanoicacid, 12-aminododecanoic acid and mixtures thereof. Preferably, the amino acids are selected from the group comprising or consisting of aminocaproic acid, amino-12-dodecanoic acid and mixtures thereof.

As an example of a lactone, mention may be made of caprolactone, valerolactone and butyrolactone.

Whatever the nature of the polyamide monomers which can be used in the context of the present invention, it is advantageous for the number-average molecular weight (Mn) to be within a range extending from 4000 to 1 000 000 g/mol, preferably from 6000 to 500 000 g/mol.

The number-average molecular weight (Mn) of the TPs is determined in a known way by size exclusion chromatography (SEC). For example in the case of polyamides, the sample is solubilized beforehand in hexafluoro-2-propanol supplemented with 0.02 M of sodium trifluoroacetate at a concentration of approximately 2 g/l. The apparatus used is a Waters Alliance chromatographic line. The elution solvent is hexafluoro-2-propanol supplemented with 0.02 M of sodium trifluoroacetate, the flow rate is 0.5 ml/min, and the temperature of the system is 35° C. A set of three Phenomenex columns in series, with the trade name "Phenogel" ("10 µm $1^5$", "10 µm $10^4$" and "10 µm $10^3$") is used. The injected volume of the solution of the polymer sample is 100 µl. The detector is a Waters 2410 differential refractometer and its associated software, for making use of the chromatographic data, is the Waters Millennium system. The calculated average molar masses are relative to a calibration curve produced with PMMA standards. The conditions can be adjusted by those skilled in the art.

Advantageously, the melting point of the polyamide of which the melting point is less than 170° C. is less than 165° C., preferably less than 160° C. Advantageously, the melting point of the polyamide of which the melting point is less than 170° C. is between 100 and 170° C., preferably between 120 and 165° C., more preferably between 130 and 160° C.

The polyamides which can be used in the context of the present invention can be synthesized in a manner well known to those skilled in the art, for example according to the processes described in documents DE 2324160, EP 0 627 454, EP 1 153 957 or else EP 1 153 957.

The polyamides which can be used in the context of the present invention are also available commercially. As an example of a polyamide of which the melting point is less than 170° C., which is commercially available, mention may be made of Orgasol 3401 or Orgasol 3402 from the company Arkema, or else the polyamides of the Elvamide series (registered trademark) from the company DuPont, such as Elvamide (registered trademark) 8061, 8063, 8066, and 8023R.

The content of polyamide of which the melting point is less than 170° C., in the composition of the tyre according to the invention, may be within a range extending from 5 to 100 phr, preferably from 10 to 90 phr. Preferably, the content of polyamide of which the melting point is less than 170° C., in the composition, is within a range extending from 20 to 80 phr, preferably from 25 to 50 phr or alternatively from 55 to 80.

II-A-3 Crosslinking System

The crosslinking system can be any type of system known to those skilled in the art in the field of rubber compositions for tyres. It can in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur and/or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferred content of between 0.5 and 12 phr, in particular between 1 and 10 phr. The vulcanization accelerator is used at a preferential content of between 0.5 and 10 phr, more preferentially of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to M BTS), N-cyclohexyl-2-benzothiazole-sulfenamide (CBS), N,N-dicyclohexyl-2-benzothiazole-sulfenamide (DCBS), N-(tert-butyl)-2-benzothiazole-sulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

II-A-4 Reinforcing Filler

The composition of the tyre according to the invention does not require a reinforcing filler, which is one of its advantages since this makes it possible to greatly reduce the hysteresis of the composition, and thus the rolling resistance of the tyre.

Thus, preferably, the composition of the tyre according to the invention does not comprise a reinforcing filler or comprises less than 150 phr thereof.

The composition of the tyre can comprise from 5 to 150 phr, preferably from 10 to 80 phr, preferably from 15 to 60 phr, preferably from 20 to 55 phr, of reinforcing filler, known for its capacity to reinforce a rubber composition that can be used for the manufacture of tyres.

Advantageously, the composition of the tyre according to the invention does not comprise any reinforcing filler or comprises less than 30 phr thereof, preferably less than 25 phr, preferably less than 20 phr, preferably less than 15 phr, preferably less than 10 phr, preferably less than 5 phr.

The reinforcing filler can be an organic filler such as carbon black, an inorganic filler such as silica or else a mixture of these two types of fillers.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks could, for example, already be incorporated into the diene elastomer, in particular isoprene elastomer, in the form of a masterbatch (see for example applications WO 97/36724-A2 or WO 99/16600-A1).

Mention may be made, as an example of organic fillers other than carbon blacks, of functionalized polyvinyl organic fillers, such as described in applications WO2006/069792-A1, WO2006/069793-A1, WO2008/003434-A1 and WO2008/003435-A1.

The term "reinforcing inorganic filler" should be understood here as meaning any inorganic or mineral filler, whatever its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of tyres. In a known manner, certain reinforcing inorganic fillers can be characterized in particular by the presence of hydroxyl groups (—OH) on their surface.

Mineral fillers of the siliceous type, preferentially silica ($SiO_2$), or of the aluminous type, in particular alumina ($Al_2O_3$), are suitable in particular as reinforcing inorganic fillers. The silica used can be any reinforcing silica known to those skilled in the art, in particular any precipitated or fumed silica exhibiting a BET specific surface and a CTAB specific surface both of less than 450 m$^2$/g, preferably within a range extending from 30 to 400 m$^2$/g, in particular from 60 to 300 m$^2$/g.

For inorganic fillers such as silica for example, the BET specific surface area of the inorganic filler is determined by gas adsorption using the Brunauer-Emmett-Teller method described in "The Journal of the American Chemical Society", (Vol. 60, page 309, February 1938), and more specifically according to a method derived from the standard NF ISO 5794-1, appendix E, of June 2010 [multipoint (5 point) volumetric method—gas: nitrogen—degassing under vacuum: one hour at 160° C.—relative pressure range p/po: 0.05 to 0.17]. Moreover, the CTAB specific surface area values were determined according to the standard NF ISO 5794-1, appendix G of June 2010. The process is based on the adsorption of CTAB (N-hexadecyl-N,N,N-trimethylammonium bromide) onto the "outer" surface of the reinforcing filler.

Any type of precipitated silica can be used, in particular highly dispersible precipitated silicas (termed "HDS" for "highly dispersible" or "highly dispersible silica"). These precipitated silicas, which may or may not be highly dispersible, are well known to those skilled in the art. Mention may be made, for example, of the silicas described in applications WO 03/016215-A1 and WO 03/016387-A1. Among the commercial HDS silicas, it is possible in particular to use the silicas "Ultrasil® 5000GR", "Ultrasil® 7000GR" from Evonik, the silicas "Zeosil® 1085GR", "Zeosil® 1115 MP", "Zeosil® 1165MP", "Zeosil® Premium 200MP", "Zeosil® HRS 1200 MP" from Solvay. As non-HDS silica, the following commercial silicas can be used: "Ultrasil® VN2GR" silicas, "Ultrasil® VN3GR" from Evonik, the silica "Zeosil® 175GR" from Solvay, the silicas "Hi-Sil EZ120G(-D)", "Hi-Sil EZ160G(-D)", "Hi-Sil EZ200G(-D)", "Hi-Sil 243LD","Hi-Sil 210","Hi-Sil HDP 320G" from PPG.

As other examples of inorganic fillers that can be used in the rubber compositions of the invention, mention may also be made of mineral fillers of the aluminous type, in particular alumina ($Al_2O_3$), aluminium oxides, aluminium hydroxides, aluminosilicates, titanium oxides, silicon carbides or nitrides, all of the reinforcing type as described for example in applications WO 99/28376-A2, WO 00/73372-A1, WO 02/053634-A1, WO2004/003067-A1, WO2004/056915-A2, U.S. Pat. No. 6,610,261-B1 and U.S. Pat. No. 6,747,087-B2. Mention may in particular be made of the aluminas "Baikalox A125" or "CR125" (Baïkowski company), "APA-100RDX" (Condea), "Aluminoxid C" (Evonik) or "AKP-G015" (Sumitomo Chemicals).

The physical state in which the reinforcing inorganic filler is provided is not important, whether it is in the form of a powder, of microbeads, of granules, or else of beads or any other appropriate densified form. Of course, reinforcing inorganic filler is also understood to mean mixtures of different reinforcing inorganic fillers, in particular of silicas as described above.

Those skilled in the art will understand that, instead of the reinforcing inorganic filler described above, a reinforcing filler of another nature could be used, as long as this reinforcing filler of another nature is covered with an inorganic layer such as silica, or else would comprise functional sites, in particular hydroxyls, at its surface, requiring the use of a coupling agent to establish the bond between this reinforcing filler and the diene elastomer. By way of example, mention may be made of carbon blacks partially or fully covered with silica, or carbon blacks modified with silica, such as, without limitation, the fillers of the "Ecoblack®" type of the "CRX2000" series or of the "CRX4000" series from Cabot Corporation.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler and a second functional group comprising a sulfur atom, said second functional group being able to interact with the diene elastomer.

Preferably, the organosilanes are selected from the group consisting of organosilane polysulfides (symmetrical or asymmetrical) such as bis(3-triethoxysilylpropyl) tetrasulfide, abbreviated to TESPT sold under the name "Si69" by Evonik or bis(triethoxysilylpropyl)disulfide, abbreviated to TESPD sold under the name "Si75" by Evonik, polyorganosiloxanes, mercaptosilanes, blocked mercaptosilanes, such as S-(3-(triethoxysilyl)propyl) octanethioate sold by Momentive under the name "NXT Silane". More preferentially, the organosilane is an organosilane polysulfide.

Of course, use might also be made of mixtures of the coupling agents described above.

When an inorganic filler is used, the content of coupling agent in the composition of the tyre according to the invention is advantageously less than or equal to 10 phr, it being understood that it is generally desirable to use as little as possible thereof. Typically, the content of coupling agent represents from 0.5% to 15% by weight, with respect to the amount of reinforcing inorganic filler. Its content is preferably within a range extending from 0.5 to 7.5 phr, more preferentially within a range extending from 3 to 3 phr. This content is easily adjusted by those skilled in the art according to the content of reinforcing inorganic filler used in the composition of the invention.

Preferably, the reinforcing filler of the rubber composition of the tyre according to the invention comprises a carbon black, a silica or a mixture thereof. Even more preferentially, the reinforcing filler comprises predominantly, preferably exclusively, carbon black.

II-A-5 Other Possible Additives

The rubber compositions of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

However, it is advantageous for the composition of the tyre according to the invention not to comprise any plasticizer that is liquid at 23° C. or to comprise less than 9 phr thereof, preferably less than 5 phr.

Plasticizers that are liquid at 23° C., whether of an aromatic or non-aromatic nature, known for their plasticizing properties with respect to diene elastomers, can be used. At ambient temperature (23° C.), these plasticizers or these oils, which are more or less viscous, are liquids (that is to say, as a reminder, substances which have the ability to eventually take on the shape of their container), as opposed especially to hydrocarbon-based plasticizing resins which are by nature solid at ambient temperature.

As an example of a plasticizer that is liquid at 23° C., mention may be made of those selected from the group comprising or consisting of liquid diene polymers, polyolefin oils, naphthenic oils, paraffinic oils, DAE oils, MES (Medium Extracted Solvates) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, plant oils, ether plasticizers, ester plasticizers, phosphate plasticizers, sulfonate plasticizers and mixtures thereof.

Furthermore, the composition according to the invention advantageously does not comprise an epoxy resin; preferably, the composition does not comprise a reinforcing resin (or curing resin), known to those skilled in the art for stiffening rubber compositions.

II-B Preparation Process

A subject of the present invention is also a process for preparing a composition for the manufacture of tyres according to the invention, characterized in that it comprises the following steps:

a) bringing into contact and mixing, concomitantly or successively, in one or more goes, at least one epoxidized polyisoprene having a molar degree of epoxidation greater than 40%, and a polyamide (the melting point of which is preferably less than 170° C.), by thermomechanically kneading everything until reaching a maximum temperature T1 greater than or equal to the melting point of the polyamide (of which the melting point is preferably less than 170° C.), b) reducing the temperature of the mixture obtained in step (a) to a maximum temperature T2 lower than the melting point of the polyamide (the melting point of which is preferably less than 170° C.), then incorporating a crosslinking system into the mixture and kneading everything.

The process according to the invention can be carried out using two successive phases of preparation according to a general procedure well known to those skilled in the art: step (a) thus constitutes a first phase of thermomechanical working or kneading (sometimes referred to as a "non-productive" phase) at high temperature, up to a maximum temperature of between 130° C. and 190° C., preferably between 140° C. and 180° C., followed by a second phase of mechanical working (sometimes referred to as a "productive" phase) (step (b) of the process according to the invention) at lower temperature, typically less than 110° C., for example between 60° C. and 100° C., during which finishing phase the crosslinking system is incorporated. Such phases have been described for example in applications EP 0 501 227 A, EP 0 735 088 A, EP 0 810 258 A, WO 2000/05300 or WO 2000/05301.

The first (non-productive) phase can be preferentially performed in several thermomechanical steps. During a first step, at least one epoxidized polyisoprene having a molar degree of epoxidation greater than 40%, a polyamide of which the melting point is less than 170° C., and optionally one or more reinforcing fillers are introduced into an appropriate mixer, such as a usual internal mixer, at a temperature of between 20° C. and 100° C. and, preferably, between 25° C. and 100° C. After a few minutes, preferentially from 0.5 to 2 min, and a rise in temperature to 90° C. to 100° C., the other ingredients (that is to say those which remain if not all have not been introduced at the start) can be added all at once or in parts, with the exception of the crosslinking system, during kneading ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system (preferably the vulcanization system) is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for laboratory characterization, or also extruded, in order to form, for example, a rubber profiled element used in the manufacture of semi-finished products, in order to obtain products such as a tyre tread. These products can subsequently be used for the manufacture of tyres, according to techniques known to those skilled in the art.

The crosslinking (or curing) is performed in a known manner at a temperature generally of between 130° C. and 200° C., under pressure, for a sufficient time which may range, for example, between 5 and 90 min, as a function notably of the curing temperature, of the vulcanization system adopted, of the kinetics of crosslinking of the composition under consideration.

The polyamide (the melting point of which is preferably less than 170° C.) can be introduced in the solid state, as sold commercially, or in the liquid state. When the polyamide (the melting point of which is preferably less than 170° C.) is introduced in liquid form, it is then necessary to carry out an additional step of heating the polyamide to a temperature above its melting point, before it is brought into contact with the other constituents of step (a). However, it is preferable to introduce the polyamide (the melting point of which is preferably less than 170° C.) in the solid state.

According to the invention, the maximum temperature T1 is preferably at least 1° C., preferably 2° C., preferably 3° C., preferably 4° C., preferably 5° C. higher than the temperature of the polyamide (the melting point of which is preferably less than 170° C.). Preferably, the maximum temperature T1 is 5 to 20° C. higher than the temperature of the polyamide (the melting point of which is preferably less than 170° C.).

According to the invention, the maximum temperature T2 is preferably less than 120° C., preferably less than 100° C., more preferably less than 90° C. Preferably, the maximum temperature T2 is within a range extending from 20 to 90° C.

II-B-1 Elastomeric Matrix

The elastomeric matrix of the process according to the invention is as defined above for the composition of the tyre according to the invention. It mainly comprises at least one epoxidized polyisoprene having a molar degree of epoxidation greater than 40%.

Advantageously, the at least one epoxidized polyisoprene, having a molar degree of epoxidation ranging from 5% to 85%, advantageously has a Mooney viscosity (ML 1+4) at 100° C., measured according to standard ASTM D1646 (1999), within a range extending from 30 to 150, preferably from 40 to 150, more preferably from 50 to 140.

The molar degree of epoxidation of the at least one epoxidized polyisoprene having a molar degree of epoxidation greater than 40% is advantageously within a range extending from 40% to less than 85%, preferably between 40% and 75%, more preferably from 42% to 60%.

The content of epoxidized polyisoprene having a molar degree of epoxidation greater than 40%, in the rubber composition of the tyre according to the invention, is advantageously within a range extending from 80 to 100 phr, preferably from 90 to 100 phr, more preferably 100 phr.

Preferably, the epoxidized polyisoprene having a molar degree of epoxidation greater than 40% is introduced during the process according to the invention at a content within a range extending from 80 to 100 phr, preferably from 90 to 100 phr, and more preferably 100 phr.

Optionally, when the polyisoprene is introduced at a content of less than 100 phr, the process according to the invention can comprise a step of incorporating another elastomer, preferably a diene elastomer. Preferentially, the other elastomer is a diene elastomer selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs). The degree of incorporation of the other elastomer during the process according to the invention is preferentially within a range extending from 0 to 20 phr, preferably from 0 to 10 phr. Advantageously, the process according to the invention does not comprise a step of incorporating non-epoxidized natural rubber. If non-epoxidized natural rubber is introduced during the process according to the invention, its degree of incorporation is less than 8 phr, preferably less than 5 phr.

II-B-2 Polyamide

The polyamide of the process according to the invention is as defined above for the composition of the tyre according to the invention. It is at least one polyamide the melting point of which is less than 170° C.

Thus, any polyamide (the melting point of which is preferably less than 170° C.) can be used.

The polyamides used in the context of the present invention can be homopolymers or copolymers, which can come from the condensation of lactams, optionally with lactones, and/or from the condensation of diacids and/or amino acids with diamines. Preferably, the polyamides used in the context of the present invention are copolymers, which come from the condensation of lactams, optionally with lactones, and/or from the condensation of diacids and/or amino acids with diamines.

Particularly advantageously, the polyamide (the melting point of which is preferably less than 170° C.) is a copolymer polyamide consisting of at least two different types of monomers selected from the group consisting of lactams, or of at least two different types of monomers selected from the group consisting of diacids and of at least two different types of monomers selected from the group consisting of diamines.

The lactams can for example have 3 to 12 carbon atoms on their main ring and can be substituted. Preferably, the lactams are selected from the group comprising or consisting of β,β-dimethylpropriolactam, α,α-dimethylpropriolactam, amylolactam, caprolactam, capryllactam, oenantholactam, 2-pyrrolidone, lauryllactam and mixtures thereof. More preferably, the lactams are selected from the group comprising or consisting of caprolactam, lauryllactam and mixtures thereof.

The diacids (or dicarboxylic acids) can be, for example, acids having between 4 18 carbon atoms. Preferably, the diacids are selected from the group comprising or consisting of adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dodecanedioic acid, and mixtures thereof. More preferably, the diacids are selected from the group comprising or consisting of adipic acid, dodecanedioic acid and mixtures thereof.

The diamines can be, for example, saturated aliphatic, aryl and/or cyclic diamines having 6 to 12 atoms. Preferably, the diamines are selected from the group comprising or consisting of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophorone diamine (IPD), methyl pentamethylenediamine (MPDM), bis(aminocyclohexyl)methane (BACM), bis(3-methyl-4 aminocyclohexyl)methane (BMACM), methaxylyenediamine, bis-p-aminocyclohexylmethane, trimethyl-hexamethylenediamine, phenylenediamine and mixtures thereof. More preferably, the diamines are selected from the group comprising or consisting of hexamethylenediamine, dodecamethylenediamine and mixtures thereof.

The amino acids can, for example, be alpha-omega amino acids. Preferably, the amino acids are selected from the group comprising or consisting of aminocaproic acid, 7-aminoheptanoic acid, 11-aminoundecanoic acid, n-heptyl-11-aminoundecanoicacid, 12-aminododecanoic acid and mixtures thereof. Preferably, the amino acids are selected from the group comprising or consisting of aminocaproic acid, amino-12-dodecanoic acid and mixtures thereof.

As an example of a lactone, mention may be made of caprolactone, valerolactone and butyrolactone. Whatever the nature of the polyamide monomers which can be used in the context of the present invention, it is advantageous for the number-average molecular weight (Mn) to be within a range extending from 4000 to 1 000 000 g/mol, preferably from 6000 to 500 000 g/mol. The number-average molecular weight (Mn) of the TPs is determined in a known way as indicated above.

Advantageously, the melting point of the polyamide of which the melting point is less than 170° C. is less than 165° C., preferably less than 160° C. Advantageously, the melting point of the polyamide of which the melting point is less than 170° C. is between 100 and 170° C., preferably between 120 and 165° C., more preferably between 130 and 160° C.

The polyamide (the melting point of which is preferably less than 170° C.) can be introduced during the process according to the invention at a content in a range extending from 5 to 100 phr, preferably 10 to 90 phr. Preferably, the polyamide (the melting point of which is preferably less than 170° C.) introduced during the process according to the invention at a content within a range extending from 20 to 80 phr, preferably from 25 to 50 phr or alternatively from 55 to 80 phr.

II-B-3 Crosslinking System

The crosslinking system of the process according to the invention is as defined above for the composition of the tyre according to the invention.

Thus, the crosslinking system can be based on sulfur and/or on peroxide and/or on bismaleimides, which are well known to those skilled in the art.

Preferentially, the crosslinking system is based on sulfur; it is then called a vulcanization system. The sulfur can be contributed in any form, in particular in the form of molecular sulfur and/or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is introduced during the process according to the invention at a preferential content of between 0.5 and 12 phr, in particular between 1 and 10 phr. The vulcanization accelerator is preferentially introduced during the process according to the invention at a preferential content of between 0.5 and 10 phr, more preferentially between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to M BTS), N-cyclohexyl-2-benzothiazole-sulfenamide (CBS), N,N-dicyclohexyl-2-benzothiazole-sulfenamide (DCBS), N-(tert-butyl)-2-benzothiazole-sulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

II-B-4 Reinforcing Filler

The process according to the invention can comprise a step of incorporating reinforcing filler, but this is not compulsory. Thus, it may be that the process according to the invention does not comprise a step of incorporating reinforcing filler. If the process according to the invention comprises a step of incorporating reinforcing filler, the reinforcing filler is as defined above for the composition of the tyre according to the invention. The process according to the invention can thus comprise a step of incorporating reinforcing filler at a content of less than 150 phr, for example at a rate within a range extending from 5 to 150 phr, preferably from 10 to 80 phr, preferably from 15 to 60, phr, preferably from 20 to 55 phr. Preferably, the reinforcing filler is incorporated at a content of less than 30 phr, preferably less than 25 phr, preferably less than 20 phr, preferably less than 15 phr, preferably less than 10 phr, preferably less than 5 phr.

Preferably, the reinforcing filler of the rubber composition of the tyre according to the invention comprises a carbon black, a silica or a mixture thereof. Even more preferentially, the reinforcing filler comprises predominantly, preferably exclusively, carbon black.

When the reinforcing filler comprises a silica, the process of course comprises a step of incorporating an agent for coupling the silica to the elastomer. The coupling agent is as defined above.

II-B-5 Other Possible Additives

The process according to the invention can comprise a step of incorporating usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

Advantageously, the process according to the invention does not comprise a step of adding a plasticizer that is liquid at 23° C. If the process according to the invention comprises a step of adding a plasticizer that is liquid at 23° C., the liquid plasticizer can be incorporated at a content of less than 9 phr, preferably less than 5 phr.

Moreover, the process according to the invention does not comprise a step of adding epoxy resin; preferably, the process according to the invention does not comprise a step of adding reinforcing resin (or curing resin).

II-C Composition That Can Be Obtained by Means of the Process According to the Invention and Tyre A subject of the present invention is also a rubber composition that can be obtained by means of a process according to the invention.

Also described in the present invention is a tread and/or at least one internal layer for a tyre comprising a composition that can be obtained by means of the process according to the invention.

A subject of the present invention is also a tyre comprising a composition that can be obtained by means of the process according to the invention or a tread and/or at least one internal layer for a tyre comprising a composition that can be obtained by means of the process according to the invention.

II-D Tyres

The invention relates in particular to tyres intended to equip motor vehicles of passenger vehicle type, SUVs ("Sport Utility Vehicles"), or two-wheel vehicles (notably motorcycles), or aircraft, or else industrial vehicles selected from vans, heavy-duty vehicles, i.e. underground trains, buses, heavy road transport vehicles (lorries, tractors, trailers) or off-road vehicles, such as heavy agricultural vehicles or construction vehicles, and the like.

It is possible to define, within the tyre, three types of regions:
The radially exterior region in contact with the ambient air, this region essentially consisting of the tread and of the outer sidewall of the tyre. An outer sidewall is an elastomeric layer positioned outside the carcass reinforcement relative to the internal cavity of the tyre, between the crown and the bead, so as to completely or partially cover the region of the carcass reinforcement extending from the crown to the bead.

The radially interior region in contact with the inflation gas, this region generally consisting of the layer airtight to the inflation gases, sometimes known as interior airtight layer or inner liner.

The internal region of the tyre, that is to say that between the exterior and interior regions. This region includes layers or plies which are referred to here as internal layers of the tyre. These are, for example, carcass plies, tread sublayers, tyre belt plies or any other layer which is not in contact with the ambient air or the inflation gas of the tyre.

The tread, the tread surface of which is provided with a tread pattern formed by a plurality of grooves delimiting elements in relief (tread blocks, ribs) so as to generate edge corners of material and also voids. These grooves represent a volume of voids which, with respect to the total volume of the tread (including both the volume of elements in relief and that of all the grooves), is expressed by a percentage denoted, in the present document, by "volumetric void ratio". A volumetric void ratio equal to zero indicates a tread without grooves or voids.

The present invention is particularly well suited to tyres intended for civil engineering or agricultural vehicles and for heavy-duty vehicles, more particularly for civil engineering or agricultural vehicles, the tyres of which are subjected to highly specific stresses, in particular the stony ground surfaces on which they run. Thus, advantageously, the tyre according to the invention or the tyre comprising a composition that can be obtained by means of the process according to the invention is a tyre for civil engineering, agricultural or heavy-duty vehicles, preferably civil engineering vehicles.

The composition defined in the present description is particularly well suited to tyre treads, in particular for a tyre for a vehicle intended to bear heavy loads, in particular from the point of view of the endurance of the tyre. Thus, advantageously, the composition of the tyre according to the invention or the composition that can be obtained by means of the process according to the invention is present in the tread of the tyre.

The tread of the tyre according to the invention may have one or more grooves, the mean depth of which ranges from 15 to 120 mm, preferably 65 to 120 mm.

The tyres according to the invention can have a diameter ranging from 20 to 63 inches, preferably from 35 to 63 inches.

Moreover, the mean volumetric void ratio over the whole of the tread of the tyre according to the invention can be within a range extending from 5% to 40%, preferably from 5% to 25%.

The composition defined in the present description is also well suited to the internal layers. Thus, the composition of the tyre according to the invention or the composition that can be obtained by means of the process according to the invention is present in at least one internal layer of the tyre. The internal layer can be selected from the group consisting of carcass plies, crown plies, bead-wire fillings, crown feet, decoupling layers, edge rubbers, padding rubbers, the tread underlayer and the combinations of these internal layers. Preferably, the internal layer is selected from the group consisting of carcass plies, crown plies, bead-wire fillings, crown feet, decoupling layers and combinations of these internal layers.

The invention relates to the tyres and semi-finished products for tyres described above, articles made of rubber, both in the raw state (that is to say, before curing) and in the cured state (that is to say, after crosslinking or vulcanization).

III—PREFERRED EMBODIMENTS

In the light of the aforementioned, the preferred embodiments of the invention are described below:

A. Tyre comprising a rubber composition based on:
  an elastomeric matrix mainly comprising at least one epoxidized polyisoprene having a molar degree of epoxidation greater than 40%,
  at least one polyamide, the melting point of which is less than 170° C., and
  a crosslinking system.

B. Tyre according to embodiment A, wherein the epoxidized polyisoprene mainly comprises an epoxidized natural rubber.

C. Tyre according to embodiment A or B, wherein the molar degree of epoxidation of the at least one epoxidized polyisoprene having a molar degree of epoxidation greater than 40% is within a range extending from 40% to 85%, preferably between 40% and 75%.

D. Tyre according to any one of embodiments A to C, wherein the at least one epoxidized polyisoprene having a molar degree of epoxidation greater than 40% has a Mooney viscosity (ML 1+4) at 100° C. measured according to standard ASTM D1646 (1999) within a range extending from 30 to 150, preferably from 40 to 150, more preferably from 50 to 140.

E. Tyre according to any one of embodiments A to D, wherein the content of epoxidized polyisoprene having a molar degree of epoxidation greater than 40%, in the composition, is within a range extending from 80 to 100 parts by weight per hundred parts by weight of elastomer, phr, preferably from 90 to 100 phr, more preferably is 100 phr.

F. Tyre according to any one of embodiments A to E, wherein the composition comprises less than 10 phr, preferably less than 8 phr, of non-epoxidized natural rubber.

G. Tyre according to any one of embodiments A to F, wherein the content of polyamide, the melting point of which is less than 170° C., in the composition, is within a range extending from 5 to 100 phr, preferably from 20 to 80 phr.

H. Tyre according to any one of embodiments A to G, wherein the polyamide, the melting point of which is less than 170° C., is a copolymer polyamide consisting of at least two different types of monomers selected from the group consisting of lactams, or of at least two different types of monomers selected from the group consisting of diacids and of at least two different types of monomers selected from the group consisting of diamines.

I. Tyre according to embodiment H, wherein the lactams are selected from the group consisting of β,β-dimethylpropriolactam, α,α-dimethylpropriolactam, amylolactam, caprolactam, capryllactam, oenantholactam, 2-pyrrolidone and lauryllactam and mixtures thereof.

J. Tyre according to embodiment H or I, wherein the diacids are selected from the group consisting of adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dodecanedioic acid and mixtures thereof.

K. Tyre according to any one of embodiments H to J, wherein the diamines are selected from the group consisting of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophorone diamine (IPD), methyl pentamethylenediamine (MPDM), bis(aminocyclohexyl)methane (BACM), bis(3-methyl-4 aminocyclohexyl)methane (BMACM), methaxylyenediamine, bis-p-aminocyclohexylmethane, trimethylhexamethylenediamine, phenylenediamine and mixtures thereof.

L. Tyre according to any one of embodiments A to K, wherein the melting point of the polyamide, the melting point of which is less than 170° C., is between 100 and 170° C., preferably between 120 and 165° C., preferably between 130 and 160° C.

M. Tyre according to any one of embodiments A to L, wherein the composition does not comprise reinforcing filler or comprises less than 150 phr thereof.

N. Tyre according to embodiment L, wherein the reinforcing filler comprises carbon black, a reinforcing inorganic filler or a mixture thereof.

O. Tyre according to embodiment M or N, wherein the reinforcing filler mainly, preferably exclusively, comprises carbon black.

P. Tyre according to any one of embodiment A to O, wherein the crosslinking system is based on molecular sulfur and/or on a sulfur-donating agent.

Q. Tyre according to any one of embodiments A to P, wherein the composition does not comprise a plasticizer that is liquid at 23° C., or comprises less than 9 phr thereof, preferably less than 5 phr.

R. Tyre according to any one of the embodiments A to Q, wherein the composition does not comprise epoxy resin; preferably, the composition does not comprise reinforcing resin.

S. Tyre according to any one of embodiments A to R, wherein the composition is present in the tread of the tyre.

T. Tyre according to any one of embodiments A to S, said tyre being a tyre for civil engineering, agricultural or heavy-duty vehicles, preferably civil engineering vehicles.

U. Process for preparing a composition for the manufacture of tyres according to any one of embodiments A to T, characterized in that it comprises the following steps:
 a) bringing into contact and mixing, concomitantly or successively, in one or more goes, at least one epoxidized polyisoprene having a molar degree of epoxidation greater than 40%, and a polyamide, the melting point of which is less than 170° C., by thermomechanically kneading everything until reaching a maximum temperature T1 greater than or equal to the melting point of the polyamide of which the melting point is less than 170° C.,
 b) reducing the temperature of the mixture obtained in step (a) to a maximum temperature T2 lower than the melting point of the polyamide, the melting point of which is less than 170° C., then incorporating a crosslinking system into the mixture and kneading everything.

V. Process according to embodiment U, wherein the polyamide, the melting point of which is less than 170° C., is introduced in the solid state.

W. Process according to embodiment U or V, wherein the maximum temperature T1 is 5 to 20° C. higher than the temperature of the polyamide, the melting point of which is lower than 170° C.

X. Process according to any one of embodiments U to W, wherein the maximum temperature T2 is less than 120° C., preferably less than 100° C.

Y. Rubber composition that can be obtained by means of the process according to any one of embodiments U to X.

Z. Tyre comprising a composition according to embodiment Y.

IV—EXAMPLES

IV-1 Measurements and Tests Used

Dynamic Properties (After Curing): Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the true secant modulus measured in first elongation, calculated by normalizing to the true cross section (at any moment) of the test specimen. The true secant moduli (in MPa) are measured in first elongation at 50%, 100% and 300% elongation, respectively denoted M50, M100 and M300.

The elongation at break (EB %) and breaking stress (BS) tests are based on the standard NF ISO 37 of December 2005 on an H2 dumbbell specimen and are measured at a tensile speed of 500 mm/min. The elongation at break is expressed as a percentage of elongation. The breaking stress is expressed in MPa.

All these tensile measurements are carried out under the standard conditions of temperature (23±2° C.) and hygrometry (50±5% relative humidity), according to French Standard NF T 40-101 (December 1979).

The dynamic properties tan(δ)max at 40° C. are measured on a viscosity analyser (Metravib VA4000) according to Standard ASTM D 5992-96. The response of a sample of crosslinked composition (two discs with a thickness of 2 mm and a diameter of 10 mm), subjected to a simple alternating sinusoidal shear stress, at a frequency of 10 Hz, under defined temperature conditions, for example 40° C., according to standard ASTM D 1349-99 or, as appropriate, at a different temperature, is recorded. A strain amplitude sweep is carried out from 0.1% to 50% (outward cycle) and then from 50% to 1% (return cycle). For the return cycle, the maximum value of tan(δ) observed, denoted by tan(δ)max, at 40° C. is indicated.

The elongation at break and modulus of rupture results are expressed in base 100, the value 100 being assigned to the control. A result of less than 100 indicates improved performance, that is to say that the composition of the example in question reflects better mechanical properties.

The results for tan(δ)Max at 40° C. are expressed in base 100, the value 100 being assigned to the control. A result of less than 100 indicates improved performance, that is to say that the composition of the example in question reflects better hysteresis and therefore reduced rolling resistance.

IV-2 Preparation of the Compositions

The tests which follow are carried out in the following way: the polyamide then the elastomer and also the various other ingredients, with the exception of the crosslinking system, are successively introduced into a blade mixer (final degree of filling: approximately 70% by volume), the initial vessel temperature of which is approximately 170° C. Thermomechanical working (non-productive phase) is then carried out in one step, which lasts in total approximately from 3 to 5 min, until a maximum "dropping" temperature of 180° C. is reached.

The mixture thus obtained is recovered and cooled and then the crosslinking system is incorporated on a mixer (homofinisher) at 30° C., everything being mixed (productive phase) in a roll mill for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

The samples thus produced were cured for 20 minutes at 170° C. in a bell press. The samples were analysed after having been cooled at ambient temperature for 24 hours.

IV-3 Tests on Rubber Compositions

The purpose of the examples below is to compare the mechanical properties (elongation at break) of a composition in accordance with the invention (C1) with those of a control composition (T1) of the prior art, and also with a control composition (T2) which differs from the composition C1 only in that the polyisoprene is not epoxidized. The formulations (in phr) and the properties thereof have been summarized in Table 1 below.

TABLE 1

|  | T1 | T2 | C1 | C2 | C3 |
|---|---|---|---|---|---|
| NR (1) | — | 100 | — | — | — |
| ENR50 (2) | 100 | — | 100 | 100 | 100 |
| N115 (3) | 45 | — | — | — | — |
| PA (4) | — | 27 | 27 | 47 | 74 |
| Sulfur | 1.5 | 1.5 | 1.5 | 1.5 | 1.5 |
| CBS (5) | 1 | 1 | 1 | 1 | 1 |
| % AR | 100 | 173 | 210 | 192 | 207 |
| tan(d)max at 40° C. | 100 | * | 56 | 60 | 60 |

(1) Natural rubber
(2) Epoxidized natural rubber at 50 mol % (Epoxyprene 50 from the company Guthrie)
(3) Carbon black Grade ASTM N234 (from the company Cabot)
(4) Polyamide (Elvamide 8063 from the company Dupont)
(5) N-Cyclohexyl-2-benzothiazolesulfenamide (Santocure CBS from the company Flexsys)
* Not measured Other examples have been carried out to demonstrate the effect of the molar degree of epoxidation of polyisoprene, and also the effect of the content of polyamide in the composition. The formulations tested (in phr) and the properties thereof have been summarized in Table 2 below.

TABLE 2

|  | T3 | C1 | C2 | C3 | T2 |
|---|---|---|---|---|---|
| NR (1) | — | — | — | — | 100 |
| ENR50 (2) | — | 100 | 100 | 100 | — |
| ENR25 (6) | 100 | — | — | — | — |
| PA (4) | 29 | 29 | 47 | 74 | 29 |
| Sulfur | 1.5 | 1.5 | 1.5 | 1.5 | 1.5 |
| CBS (5) | 1 | 1 | 1 | 1 | 1 |
| Modulus of rupture | 100 | 127 | 156 | 246 | 42 |

(1) to (5): see Table 1
(6) Epoxidized natural rubber at 25 mol % (Epoxyprene 25 from the company Guthrie)

All of these results show that the concomitant use of epoxidized polyisoprene having a molar degree of epoxidation greater than 40%, and of a polyamide, the melting point of which is less than 170° C., makes it possible to improve the mechanical properties of rubber compositions, in particular compared to compositions comprising a polyisoprene having a molar degree of epoxidation of less than 40% or a non-epoxidized polyisoprene. The compositions according to the invention also exhibit improved hysteresis, and therefore improved rolling resistance. Moreover, it has been observed that increasing the content of polyamide, the melting point of which is less than 170° C., in the composition, makes it possible to further increase the modulus of rupture of the composition, which presents a substantial advantage for the life of the tyre, without penalizing the hysteresis.

The invention claimed is:

1. A process for preparing a rubber composition for the manufacture of a tire comprising a rubber composition based on an elastomeric matrix mainly comprising at least one epoxidized polyisoprene having a molar degree of epoxidation greater than 40%, at least one polyamide, the melting point of which is less than 170° C., and a crosslinking system, the process comprising the following steps:
    (a) bringing into contact and mixing, concomitantly or successively, the at least one epoxidized polyisoprene having a molar degree of epoxidation greater than 40% and the at least one polyamide, the melting point of which is less than 170° C., by thermomechanically kneading until reaching a maximum temperature T1 greater than or equal to the melting point of the at least one polyamide; and
    (b) reducing the temperature of the mixture obtained in step (a) to a maximum temperature T2 lower than the melting point of the at least one polyamide, then incorporating the crosslinking system into the mixture and kneading the mixture.

2. The process according to claim 1, wherein the at least one polyamide is introduced in a solid state.

3. The process according to claim 1, wherein the maximum temperature T1 is 5 to 20° C. higher than the melting point of the at least one polyamide.

4. The process according to claim 1, wherein the maximum temperature T2 is less than 120° C.

5. A rubber composition obtained by the process according to claim 1.

6. A tire comprising a rubber composition according to claim 5.

* * * * *